United States Patent
Li et al.

(10) Patent No.: US 12,457,480 B2
(45) Date of Patent: Oct. 28, 2025

(54) METHODS TO MAINTAINING NETWORK QUALITY OF SERVICE FOR IN-VEHICLE APPLICATIONS

(71) Applicant: GM Global Technology Operations LLC, Detroit, MI (US)

(72) Inventors: Chuan Li, Troy, MI (US); Fan Bai, Ann Arbor, MI (US); Can Carlak, Ann Arbor, MI (US); Sheng Liu, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 492 days.

(21) Appl. No.: 18/150,371

(22) Filed: Jan. 5, 2023

(65) Prior Publication Data

US 2024/0236626 A1 Jul. 11, 2024

(51) Int. Cl.
*H04W 4/44* (2018.01)
*H04L 67/289* (2022.01)
(Continued)

(52) U.S. Cl.
CPC ............ *H04W 4/44* (2018.02); *H04L 67/289* (2013.01); *H04W 4/021* (2013.01); *H04W 4/029* (2018.02); *H04W 28/0226* (2013.01)

(58) Field of Classification Search
CPC ....... H04W 4/44; H04W 4/021; H04W 4/029; H04W 28/0226; H04W 4/40; H04W 24/10; H04W 24/08; H04W 28/06; H04W 4/02; H04W 64/00; H04W 4/024; H04W 4/00; H04W 88/06; H04W 64/003; H04W 88/02; H04W 4/027; H04W 4/38; H04W 16/18; H04W 24/02; H04W 8/005; H04W 4/023; H04W 12/68; H04W 12/72; H04W 76/10;
(Continued)

(56) References Cited

U.S. PATENT DOCUMENTS 11,595,619 B1    2/2023   Gate et al.
2012/0105637 A1  5/2012   Yousefi et al.
(Continued)

OTHER PUBLICATIONS

"Cadillac Celestiq Establishes New Standard of Automotive Luxury," Cadillac Pressroom, Oct. 27, 2022, https://media.cadillac.com/media/us/en/cadillac/home.detail.print.html/content/Pages/news/us/en/2022/oct/1017-celestiq.html.
(Continued)

*Primary Examiner* — Diane D Mizrahi
*Assistant Examiner* — Jing Gao
(74) *Attorney, Agent, or Firm* — Vivacqua Crane, PLLC

(57) ABSTRACT

A method for maintaining network quality of service (QoS) for in-vehicle applications includes receiving historical network speed data from a plurality of remote actors and mapping a network speed along the road ahead of the host vehicle using the historical network speed data from the plurality of remote actors and identifying a bad network coverage zone along the road ahead of the host vehicle. The method further includes determining an amount of time that the host vehicle will spend in the bad network coverage zone, determining an amount of application data to cache as a function of the amount of time that the host vehicle will spend in the bad network coverage zone, and caching the amount of application data before the host vehicle reaches the bad network coverage zone.

13 Claims, 3 Drawing Sheets

(51) Int. Cl.
  *H04W 4/021* (2018.01)
  *H04W 4/029* (2018.01)
  *H04W 28/02* (2009.01)

(58) Field of Classification Search
  CPC ... H04W 88/04; H04W 4/025; H04W 36/302; H04W 4/46; H04W 28/0268; H04W 36/0011; H04W 80/00; H04W 72/56; H04W 88/14; H04W 92/18; H04W 40/24; H04W 84/20; H04W 40/00; H04W 72/20; H04W 4/06; H04W 40/22; H04W 64/006; H04W 4/026; H04W 40/20; H04W 12/63; H04W 40/12; H04W 72/542; H04W 40/30; H04W 4/50; H04W 36/304; H04W 36/0055; H04W 48/10; H04W 52/0245; H04W 52/24; H04W 52/0258; H04W 52/40; H04W 84/005; H04W 28/0231; H04W 28/04; H04W 36/32; H04W 4/022; H04W 40/248; H04W 12/64; H04W 28/0236; H04W 28/0278; H04W 40/08; H04W 40/28; H04W 40/34; H04W 52/0235; H04W 52/0264; H04W 28/0958; H04W 28/14; H04W 36/02; H04W 36/30; H04W 36/322; H04W 36/324; H04W 36/36; H04W 72/543; H04W 72/563; H04W 74/00; H04W 76/27; H04L 67/289
  See application file for complete search history.

(56) References Cited

U.S. PATENT DOCUMENTS

| | | |
|---|---|---|
| 2017/0150299 A1 | 5/2017 | Coutinho et al. |
| 2017/0347158 A1 | 11/2017 | Fu et al. |
| 2018/0139585 A1 | 5/2018 | Gholmieh et al. |
| 2018/0297210 A1 | 10/2018 | Peterson et al. |
| 2018/0367731 A1 | 12/2018 | Gatti et al. |
| 2019/0073539 A1 | 3/2019 | Yu et al. |
| 2019/0253853 A1 | 8/2019 | Makled et al. |
| 2019/0320328 A1 | 10/2019 | Magzimof et al. |
| 2019/0325667 A1 | 10/2019 | Kim et al. |
| 2019/0340844 A1 | 11/2019 | Tonshal et al. |
| 2019/0354111 A1 | 11/2019 | Cheng et al. |
| 2019/0355178 A1 | 11/2019 | Martinez et al. |
| 2020/0074326 A1 | 3/2020 | Balakrishnan et al. |
| 2020/0351322 A1 | 11/2020 | Magzimof et al. |
| 2021/0109881 A1 | 4/2021 | Moustafa et al. |
| 2021/0256754 A1 | 8/2021 | Guo |
| 2022/0137615 A1 | 5/2022 | Eperjesi et al. |
| 2022/0161816 A1 | 5/2022 | Gyllenhammar et al. |
| 2022/0368860 A1 | 11/2022 | Shinohara et al. |
| 2022/0368972 A1 | 11/2022 | Cheraghi et al. |
| 2022/0394283 A1 | 12/2022 | Cao |
| 2023/0041568 A1* | 2/2023 | Pan ................ H04W 28/0236 |
| 2023/0096468 A1 | 3/2023 | Ong et al. |
| 2023/0269566 A1 | 8/2023 | Spagnolini et al. |
| 2024/0205642 A1* | 6/2024 | Buzzalino ........... H04L 67/1095 |

OTHER PUBLICATIONS

Ahlswede, et al. "Network Information Flow," IEEE Transactions on Information Theory, vol. 46, No. 4, Jul. 2000, pp. 1204-1216.

Byers, et al. "A digital fountain approach to reliable distribution of bulk data," Conference on Applications, Technologies, Architectures, and Protocols for Computer Communication, 1998, pp. 56-67.

Chou, et al. "Practical Network Coding," Microsoft Allerton Conference on Communication, Control, and Computing, Oct. 2003, pp. 1-10.

Lopez, Jonathan. "General Motors Developing Connected Camera Platform," GM Authority Blog, Oct. 11, 2021, https://gmauthority.com/blog/2021/10/general-motors-developing-connected-camera-platform/.

* cited by examiner

METHODS TO MAINTAINING NETWORK QUALITY OF SERVICE FOR IN-VEHICLE APPLICATIONS

INTRODUCTION

The present disclosure relates to systems and methods for maintaining network quality of service (QoS) for in-vehicle applications.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Currently, cellular network coverage along roads may be uneven and spotty. As a consequence, in-vehicle applications in poorly network covered areas may perform inadequately. Current QoS tuning techniques typically react to current network conditions and may not be able to avoid service outages. It is therefore desirable to develop a system and method that employs network tunning techniques before the host vehicle reaches poorly network covered areas to maintain quality QoS for in-vehicle applications and avoid service outages.

SUMMARY

In an aspect of the present disclosure, the method for maintaining network QoS for in-vehicle applications includes receiving historical network speed data from a plurality of remote actors. The historical network speed data includes historical network speed measurements at different times along a road ahead of a host vehicle. The method further includes mapping a network speed along the road ahead of the host vehicle using the historical network speed data from the plurality of remote actors and identifying a bad network coverage zone along the road ahead of the host vehicle. The bad network coverage zone is a region in the road where the network speed is less than a predetermined speed threshold. The method further includes determining an amount of time that the host vehicle will spend in the bad network coverage zone, determining an amount of application data to cache as a function of the amount of time that the host vehicle will spend in the bad network coverage zone, and caching the amount of application data before the host vehicle reaches the bad network coverage zone. The method described in this paragraph improves vehicle technology by employing QoS tunning techniques before the host vehicle reaches poorly network covered areas to maintain quality QoS of in-vehicle applications and in service outages.

In an aspect of the present disclosure, the method includes receiving current network speed data. The current network speed data includes current network speed measurements at a current time along a road. The host vehicle is currently moving along the road. The network speed is mapped using the historical network speed data from the plurality of remote actors and the current network speed data.

In an aspect of the present disclosure, the method further includes virtually dividing the road into a plurality of road segments. Each of the plurality of road segments has the same length. At least two of the historical network speed measurements are taken at the same one of the plurality of road segments but at different times.

In an aspect of the present disclosure, the method includes generating a cumulative distribution function (CDF) of the historical network speed measurements. The network speed is mapped using the CDF of the historical network speed measurements.

In an aspect of the present disclosure, for a constant bit rate, the amount of application data to cache is a function of the amount of time that the host vehicle will spend in the bad network coverage zone is determined using a following equation:

$$A_c = S_{avg} \times T - A_T$$

where:
$A_T$ is a network traffic in the bad network coverage zone;
T is a time that the host vehicle will spend in the bad network coverage zone;
$S_{avg}$ is an average network speed in the bad network coverage zone; and
$A_C$ is the amount of application data to cache.

In an aspect of the present disclosure, the method further includes determining a buffer capability in the plurality of road segments using the following equations:

$$A_i = \bar{s}_i(S - \bar{s}_i)^\alpha t_i,$$
$$\alpha < 0$$

where:
i is one of the plurality of road segments of the road;
$A_i$ is an expected amount of traffic to buffer in one of the plurality of road segments;
$\bar{s}_1$ is an expected network speed in one of the plurality of road segments;
S is the maximum achievable network speed allowed by communication technology in ideal network conditions;
$t_i$ is an expected vehicle travel time in one of the plurality of road segments; and
α is a predetermined number.

One of the plurality of road segments may be the bad network coverage zone.

In an aspect of the present disclosure, the amount of application data to cache is a function of the expected amount of traffic to buffer in the bad network coverage zone.

In an aspect of the present disclosure, mapping the network speed along the road ahead of the host vehicle using the historical network speed data from the plurality of remote actors includes determining a segment network speed for each of the plurality of road segments of the road ahead of the host vehicle.

In an aspect of the present disclosure, the method further includes controlling a QoS parameter of a real-time application based on the segment network speed at a first road segment of the plurality of road segments before the host vehicle reaches the first road segment of the plurality of road segments.

In an aspect of the present disclosure, the QoS parameter may be one or more of bitrate, received signal strength indicator (RSSI), delay, jitter, video codec, video resolution, and/or framerate.

The present disclosure also describes a tangible, non-transitory, machine-readable medium, including machine-readable instructions, that when executed by one or more processors, cause one or more processors to execute the methods described above.

The present disclosure also describes a system including a communication transceiver and a controller in communication with the communication transceiver. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
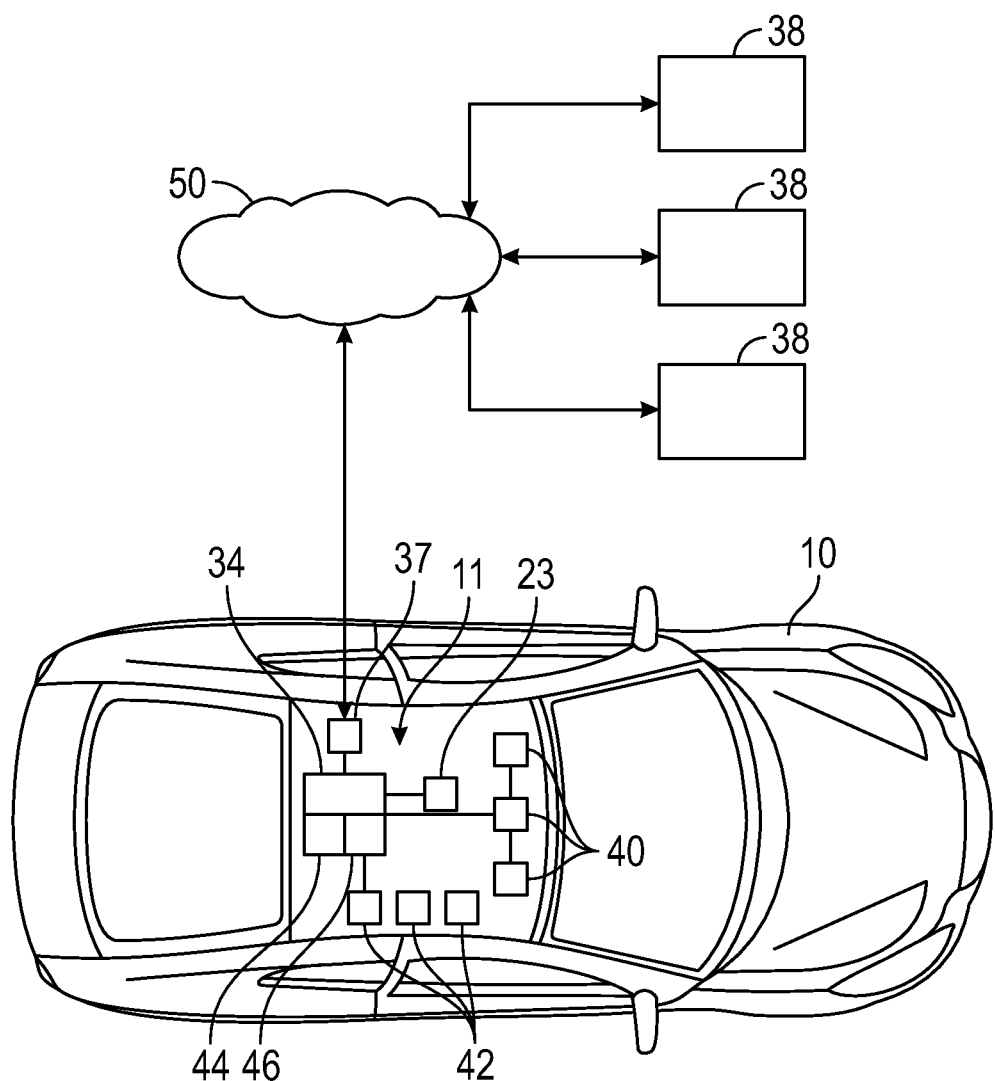
FIG. 1 is a schematic top view of a vehicle including a system for maintaining network QoS for in-vehicle applications.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 includes (or is in communication with) a system 11 for maintaining network QoS for in-vehicle applications. While the system 11 is shown inside the host vehicle 10, it is contemplated that the system 11 may be outside of the host vehicle 10. As a non-limiting example, the system 11 may be a cloud-based system in wireless communication with the host vehicle 10. Although the host vehicle 10 is shown as a sedan, it is envisioned that that host vehicle 10 may be another type of vehicle, such as a pickup truck, a coupe, a sport utility vehicle (SUVs), a recreational vehicle (RVs), etc. The host vehicle 10 may be an autonomous vehicle configured to drive autonomously.

The host vehicle 10 includes a controller 34 and one or more sensors 40 in communication with the controller 34. The sensors 40 collect information and generate sensor data indicative of the collected information. As non-limiting examples, the sensors 40 may include Global Navigation Satellite System (GNSS) transceivers or receivers, yaw rate sensors, speed sensors, lidars, radars, ultrasonic sensors, and cameras, among others. The GNSS transceivers or receivers are configured to detect the location of the host vehicle 10 in the globe. The speed sensors are configured to detect the speed of the host vehicle 10. The yaw rate sensors are configured to determine the heading of the host vehicle 10. The cameras may have a field of view large enough to capture images in front, in the rear, and in the sides of the host vehicle 10. The ultrasonic sensor may detect dynamic objects.

The system 11 further includes a controller 34 in communication with the sensors 40. The controller 34 includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the host vehicle 10.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the host vehicle 10, and generate control signals to the actuators to automatically control the components of the host vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 3), that when executed by the one or more processors, cause the processors 44 to execute the method 100 (FIG. 3) and the method 200 (FIG. 4).

The host vehicle 10 includes a user interface 23 in communication with the controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification or alert to the vehicle user of the host vehicle 10. The user interface 23 is in electronic communication with the controller 34 and is configured to receive inputs from a vehicle user (e.g., a vehicle user or a vehicle passenger). For example, the user interface 23 may include a touch screen and/or buttons configured to receive inputs from a vehicle user. Accordingly, the controller 34 is configured to receive inputs from the vehicle user via the user interface 23 and to provide an output (i.e., an alert) to the vehicle user.

The host vehicle 10 may include one or more communication transceivers 37 in communication with the controller 34. Each of the communication transceivers 37 is configured to wirelessly communicate information to and from other remote actor 38, such as the remote vehicles, (through "V2V" communication), infrastructure (through "V2I" communication), remote systems at a remote call center (e.g., ON-STAR by GENERAL MOTORS, and/or personal electronic devices, such as a smart phone. The communication transceivers 37 may be configured to communicate via wireless network 50, such as a cellular network. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication transceivers 37 may include one or more antennas for receiving and/or transmitting signals, such as cooperative sensing messages (CSMs). The communication transceivers 37 may be considered sensors 40 and/or sources of data. The remote vehicles may include one or more communication transceivers 37 as described above with respect to the host vehicle 10.

The host vehicle 10 includes one or more actuators 42 in communication with the controller 34. The actuators 42 control one or more vehicle features such as, but not limited to, a propulsion system, a transmission system, a steering system, and a brake system. The vehicle features may further include interior and/or exterior vehicle features such as, but are not limited to, doors, a trunk, and cabin features such as air, music, lighting, etc.

Figure 2:
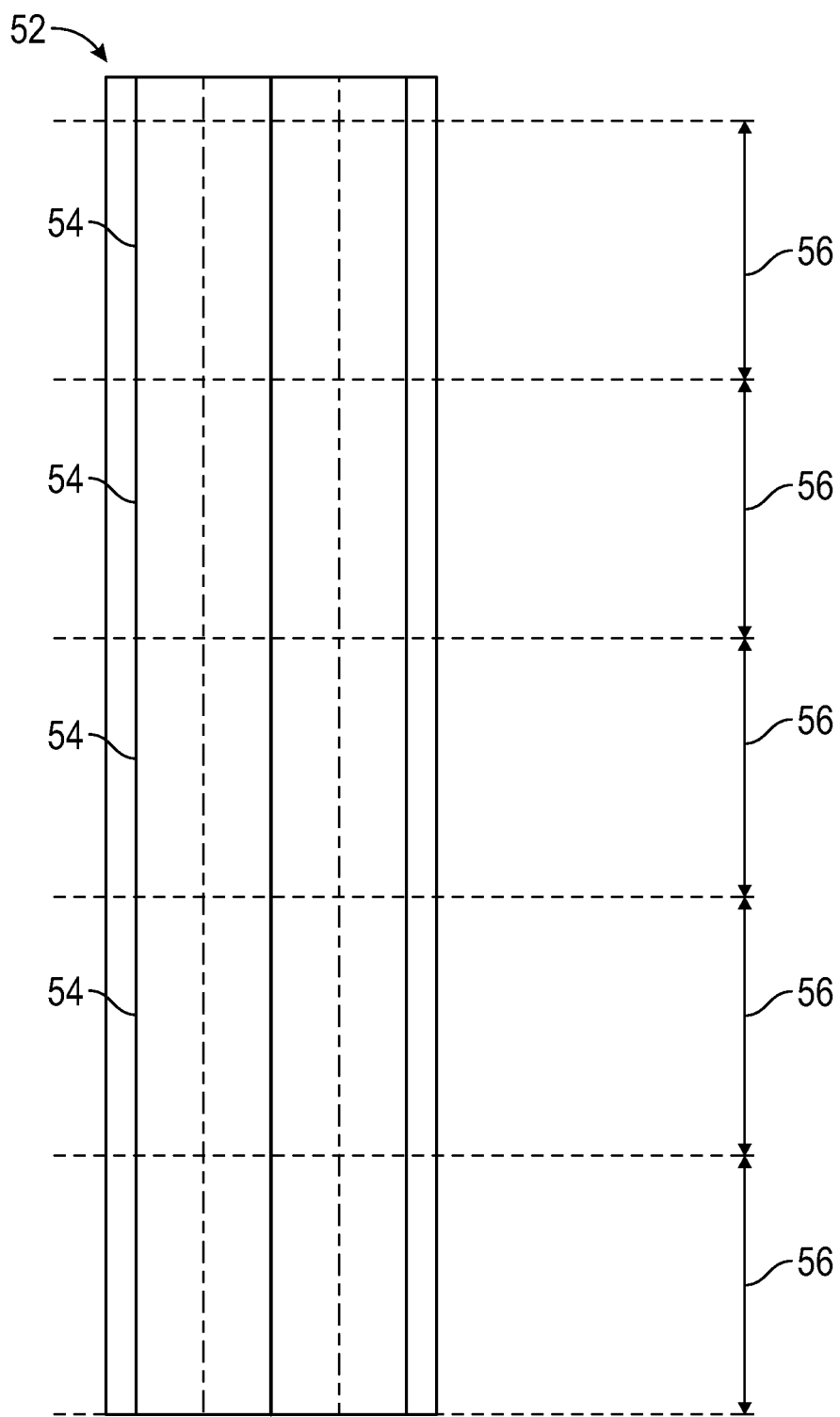
FIG. 2 is a schematic top view of a road divided into segments.

With reference to FIGS. 1 and 2, the system 11 is configured to maintain the quality of service (QoS) for in-vehicle applications. As used herein, the term, "QoS" means the description or measurement of the overall performance of a service, such as a telephony or computer network, or a cloud computing service, particularly the performance seen by the users of the network. In the present disclosure, the term "in-vehicle application" means a program (such as an infotainment application or a navigation application) that performs a particular task or set of tasks in the host vehicle 10. Currently, cellular network coverage along roads may be uneven and spotty. As a consequence, in-vehicle applications in poorly network covered areas may perform inadequately. Current QoS tuning techniques typically react to current network conditions and may not be able to avoid service outage. In contrast, the system 11 employs network QoS tunning techniques before the host vehicle 10 reaches poorly network covered areas to maintain the satisfactory QoS and avoid service outages in the in-vehicle applications. Specifically, the system 11 uses crowd-sourced network quality measurements to estimate network quality of road segments. Further, the system 11 employs a network traffic buffering mechanism by leveraging different cellular coverage quality. Specifically, for delay-tolerant applications, the system 11 uses a smart network traffic buffering approach to guarantee application QoS. The system 11 also determines the timing of application network usage profile switch to avoid service outage through network speed estimation. Specifically, for real-time applications, the system 11 proactively initiates application network usage profile switch and maintains non-interrupted application services.

Figure 3:
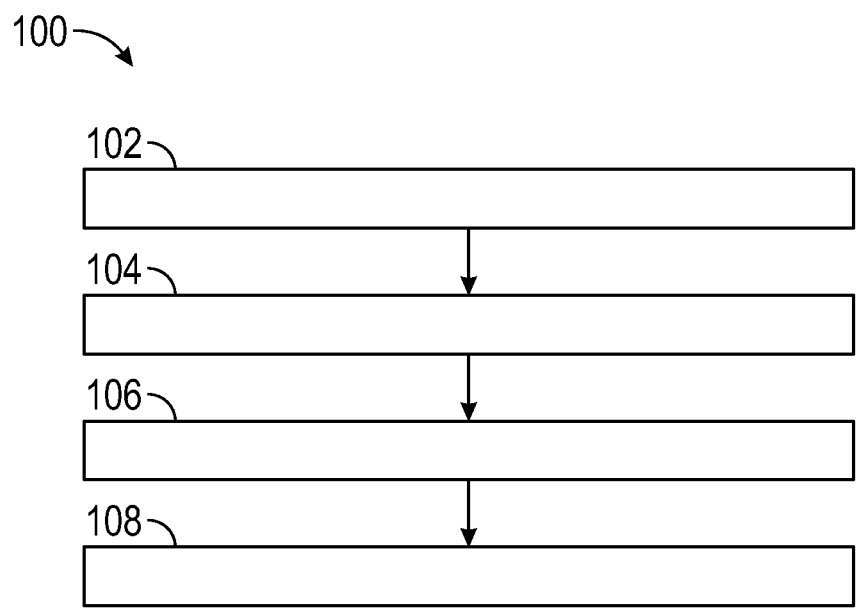
FIG. 3 is a flowchart of a method for maintaining network QoS for delay-tolerant applications.
Figure 4:
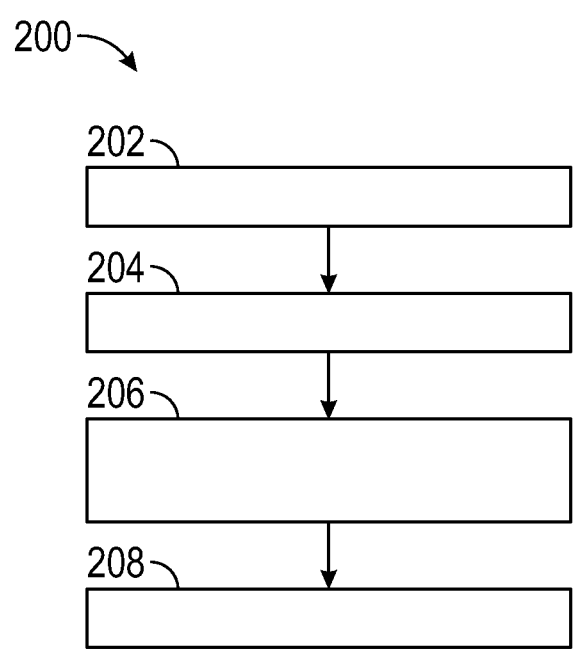
FIG. 4 is a flowchart of a method for maintaining network QoS for real-time applications.

With reference to FIGS. 2 and 3, the controller 34 of the system 11 is specifically programmed to execute the instructions of the method 100. FIG. 3 is a flowchart of the method 100 for maintaining quality QoS for delay-tolerant applications. The method 100 begins at block 102. At block 102, the controller 34 receives current network speed measurements over space on the road 52. The current measurements of the network speed may be taken by the remote actors 38 (e.g., remote vehicles) and/or the host vehicle 10. In addition to network speed, other relevant network measurements may be taken, such as primary/secondary cell signal strength, network throughput, latency, jitter, and/or cell frequency. To take the current network speed measurements (or other relevant network measurements), the road 52 is virtually divided into road segments 54. The host vehicle 10 is currently moving along the road 52. Each road segment 54 has the same length 56 and/or the same overall size in order to uniformly distribute the current network speed measurements along the road 52, thereby assuring that the system 11 maintains QoS at every location along the road 52. The controller 34 then receives the current network speed measurements (which are configured as current network speed data) from the plurality remote actors 38 and/or the sensors 40 of the host vehicle 10. The current network speed data includes the current network speed measurements at the current time at different road segments 54 of the road 52. The controller 34 then generates a statistic, such as a cumulative distribution function (CDF), relating the current network speed measurements at different locations (e.g., different road segments 54). Then, the method 100 continues to block 104.

At block 104, the controller 34 receives historical network speed measurements over time on the road 52. The historical measurements of the network speed may be taken by the remote actors 38 (e.g., remote vehicles) and/or the host vehicle 10. In addition to network speed, other relevant network measurements may be taken, such as primary/secondary cell signal strength, network throughput, latency, jitter, and/or cell frequency. To take the historical network speed measurements (or other relevant network measurements), the road 52 is virtually divided into road segments 54 as discussed above. Each road segment 54 has the same length 56 and/or the same overall size in order to uniformly distribute the historical network speed measurements along the road 52, thereby assuring that the system 11 maintains QoS at every location along the road 52. The controller 34 then receives the historical network speed measurements (which are configured as historical network speed data) from the plurality remote actors 38 and/or the sensors 40 of the host vehicle 10. The historical network speed data includes the historical network speed measurements at predetermined time intervals (e.g., twenty-four hours) but at the same location (i.e., the same road segments 54 of the road 52). For instance, for each road segment 54, the network speed may be measured every day. Alternatively, for each road segment 52, the network speed may be measured every week. The method 100 then continues to block 106.

At block 106, the controller 34 estimates and maps the network speed along the road 52 ahead of the host vehicle 10 using the historical network speed data and/or the current network speed data. As a non-limiting example, the controller 34 may solely use the historical network speed data to estimate the network speed along the road 52 ahead of the host vehicle 10. In this case, the controller 34 aggregates the historical network speed data in the past predetermined time intervals (e.g., days). Then, the controller 34 extracts a predetermined historical quantile of the overall historical network speed in the CDF.

Alternatively, at block 106, the controller 34 uses a weighted average approach to estimate and map the network speed along the road 52 ahead of the host vehicle 10 using the historical network speed data and the current network speed data. In this case, the controller 34 aggregates the historical network speed data in the past predetermined time intervals (e.g., days). Then, the controller 34 extracts the historical network speed at a predetermined historical quantile of the entire aggregated historical network speed in the CDF. Next, the controller 34 extracts the current measured network speed at a predetermined current quantile of the current measured network speed from the host vehicle 10. Then, the controller 34 determines the weighted average using the following equation:

$$q = \lambda q_h + (1 - \lambda) q_c \qquad \text{Eq. 1}$$

where:

λ is a predetermined weight;
$q_h$ is the extracted historical network speed at the predetermined historical quantile;
$q_c$ is the extracted current measured network speed at the predetermined current quantile of the current measured network speed from the host vehicle 10; and
q is the weighted average network speed.

Alternatively, at block 106, the controller 34 uses a delta approach to estimate and map the network speed along the road 52 ahead of the host vehicle 10 using the historical network speed data and the current network speed data. For each road segment 54 of the road 52, the controller 34 aggregates the historical network speed data in the past predetermined time intervals (e.g., days). For each road segment 54 of the road 52, the controller 34 extracts the historical network speed at a predetermined historical quantile of the entire aggregated historical network speed in the CDF. Next, the controller 34 extracts the current measured network speed at a predetermined current quantile of the current measured network speed from the host vehicle 10. Then, the controller 34 estimates the network speed using the following equations:

$$\Delta q_i = q_{i,h} - q_{i,c} \qquad \text{Eq. 2}$$

$$q = q_{0,c} - avg(\{\Delta q_i \mid i = 1, \ldots, M\}) \qquad \text{Eq. 3}$$

where:

i is a road segment 52 from 1 to M;
$q_{i,h}$ is extracted historical network speed at the predetermined historical quantile of the road segment i;
$q_{i,c}$ is the extracted current measured network speed at the predetermined current quantile of the current measured network speed from the host vehicle 10 of the road segment i;
$\Delta q_i$ is the difference between the $q_{i,h}$ and $q_{i,c}$;
$q_{0,h}$ is the current measured network speed from the host vehicle 10 of at the first road segment; and
q is the current segment network speed.

Using the equation above, the network speed may be mapped along the road 52. Specifically, the controller 34 uses the historical network speed data and/or the current network speed data to map the network speed of the network 50 along each road segment 54 of the road 52 ahead of the host vehicle 10. As discussed above, the network speed of the road 52 may be mapped using the CDF of the historical network speed measurements. Then, the method 100 proceeds to block 108.

At block 108, the controller 34 begins a caching process for delay-tolerant applications. Specifically, the controller 34 determines the amount of time that the host vehicle 10 will spend in the bad network coverage zone based on the vehicle speed and the length of the bad network coverage zone. The sensors 40 may be used to determine the vehicle speed, and the length of the bad network coverage zone may be obtained from navigation maps stored in the controller 34. Further, the controller 34 determines the amount of data to cache for the delay-tolerant application using the following equation:

$$A_c = A_n - A_T \qquad \text{Eq. 4}$$

where:

$A_c$ is the amount of data to cache for the delay-tolerant applications;
$A_n$ is the amount of data needed for the delay-tolerant applications; and
$A_T$ is the network traffic (i.e., amount of data downloaded or uploaded) in bad network coverage zones.

For a constant bit rate applications, the amount of application data to cache is a function of the amount of time that the host vehicle 10 will spend in the bad network coverage zone and may be determined using a following equation:

$$A_c = S_{avg} \times T - A_T \qquad \text{Eq. 5}$$

where:

$A_T$ is a network traffic in the bad network coverage zone;
T is a time that the host vehicle 10 will spend in the bad network coverage zone;
$S_{avg}$ is an application's average network speed in the bad network coverage zone; and
$A_C$ is the amount of application data to cache the delay-tolerant applications.

For a periodic bit rate application, the controller 34 may use the following equation to determine the amount of application data to cache:

$$A_c = \alpha \times S_{peak} \times T - A_T \qquad \text{Eq. 6}$$

where:

$A_T$ is a network traffic in the bad network coverage zone;
T is a time that the host vehicle 10 will spend in the bad network coverage zone;
$S_{peak}$ is the application's peak network speed in the bad network coverage zone;
α is the ratio of the peak network speed for unit of time; and
$A_C$ is the amount of application data to cache the delay-tolerant applications.

For an adaptive bit rate application, the controller 34 may use the following equation to determine the amount of application data to cache:

$$A_c = \sum_{i=0}^{M} w_t \times S_i \times T - A_T \qquad \text{Eq. 7}$$

where:
i is a time unit from 0 to M;
$A_T$ is a network traffic in the bad network coverage zone;
T is a time that the host vehicle 10 will spend in the bad network coverage zone;
$S_i$ is the application's network speed in the bad network coverage zone at the time i;
$w_t$ is a weight that is greater in recent history and is therefore inversely proportional to the time i; and
$A_C$ is the amount of application data to cache the delay-tolerant applications.

For a variable bit rate application, the controller 34 may use the following equation to determine the amount of application data to cache:

$$A_c = q(S) \times T - A_T \qquad \text{Eq. 8}$$

where:
$A_T$ is a network traffic in the bad network coverage zone;
T is a time that the host vehicle 10 will spend in the bad network coverage zone;
q(S) is the application's network speed in the bad network coverage zone at a predetermined quantile; and
$A_C$ is the amount of application data to cache the delay-tolerant applications.

In the present disclosure, the term "bad network coverage zone" means one or more road segments 54 of the road 52 where the network speed of the network 50 is less than a predetermined speed threshold. As a non-limiting example, a bad network coverage zone may refer to one road segment 54 of the road 52 in which the network download and/or upload speed is less than five megabits per second (Mbps). As discussed above, the amount of application data to cache is a function of the network traffic in the bad network coverage zone (i.e., the expected amount of traffic to buffer in the bad network coverage zone). Therefore, at block 108, the controller 34 may determine the expected amount of traffic to buffer in the bad network coverage zone using the following equation:

$$A_i = \bar{s}_1(S - \bar{s}_1)^\alpha t_i, \alpha < 0 \qquad \text{Eq. 9}$$

$$A_T = \sum_{j=0}^{M} A_i \qquad \text{Eq. 10}$$

where:
i is one of the plurality of road segments 54 of the road 52;
$A_i$ is an expected amount of traffic to buffer in one of the plurality of road segments 54;
$\bar{s}_1$ is an expected network speed in one of the plurality of road segments 54;
S is a maximum achievable network speed allowed by communication technology in ideal network conditions;
$t_i$ is an expected vehicle travel time in one of the plurality of road segments 54; and
α is a predetermined number obtained through testing; and
$A_T$ is the network traffic in the bad network coverage zones.

Then, the controller 34 caches the amount of data to cache $A_c$ for the delay-tolerant applications before the host vehicle 10 reaches the bad network coverage zone to maintain a seamless operation of the in-vehicle delay-tolerant application. As discussed above, the delay-tolerant application run on the controller 34 inside the host vehicle 10.

FIG. 4 is a flowchart of a method 200 for maintaining quality QoS for real-time applications. The method 200 begins at block 202. At block 202, the controller 34 determines the segment network speed for each of the road segments 54 of the road 52 ahead of the host vehicle 10. To do so, the controller 34 receives historical network speed measurements for each road segment 54 on the road 52. The historical measurements of the network speed may be taken by the remote actors 38 (e.g., remote vehicles) and/or the host vehicle 10 as discussed above with respect to the method 100. Also, the controller 34 receives current network speed measurements for each road segment 54 on the road 52 as discussed above with respect to the method 100. The controller 34 may then use the delta approach to determine (i.e., estimate) the network speed for each road segment 54 ahead of the host vehicle 10. First, the controller 34 aggregates the historical network speed data in the past predetermined time intervals (e.g., days). Then, the controller 34 extracts the historical network speed at a predetermined historical quantile of the entire aggregated historical network speed data. Next, the controller 34 extracts the current measured network speed at a predetermined current quantile of the current measured network speed from the host vehicle 10. Then, the controller 34 estimates the network speed in each road segment 54 using the following equations:

$$\Delta q_i = q_{i,h} - q_{i,c} \qquad \text{Eq. 11}$$

$$q = q_{-1,h} - \mu - n\sigma \qquad \text{Eq. 12}$$

$$\mu = avg(\{\Delta q_i \mid i = 1, \ldots, M\}) \qquad \text{Eq. 13}$$

where:
i is a road segment 52 from 1 to M, and the current road segment 54 is zero;
$q_{i,h}$ is extracted historical network speed at the predetermined historical quantile of the road segment i;
$q_{i,c}$ is the extracted current measured network speed at the predetermined current quantile of the current measured network speed from the host vehicle 10 of the road segment i;
$\Delta q_i$ is the difference between the $q_{i,h}$ and $q_{i,c}$;
$q_{-1,h}$ is the historical measured network speed from the host vehicle 10 of at the first road segment in the future; and
μ is the average of for the set $\{\Delta q_i | i=1, \ldots, M\}$;
σ is the standard deviation for the set $\{\Delta q_i | i=1, \ldots, M\}$;
n is a parameter that controls the probability of a false positive;
q is the segment network speed for immediately upcoming road segment 54 ahead of the host vehicle 10.

After determining the segment network speed, the method 200 proceeds to block 204. At block 204, the controller 34 determines which QoS parameters of a real-time application (and how the QoS parameter) should be controlled based on a first road segment 54 (and subsequent road segments 54) of the plurality of road segments 54 based on the segment network speed of the first road segment 54 before the host vehicle 10 reaches the first road segment 54 to maintain a quality QoS service. In the present disclosure, the term "QoS parameter" means a parameter of the real-time application that affects the QoS. As non-limiting examples, the QoS parameters include, but are not limited to, video codec, video frames per second, video resolution, video and/or audio bitrate, and usage of only audio. The method 200 then continues to block 206.

At block 206, the controller 34 informs the real-time application back server of the QoS control decision made at block 206. Then, the method 200 continues to block 208. At block 208, the QoS control decision is implemented in the in-vehicle real-time application.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for maintaining network quality of service (QOS) for in-vehicle applications, comprising:
    receiving historical network speed data from a plurality of remote actors, wherein the historical network speed data includes historical network speed measurements at different times along a road ahead of a host vehicle;
    mapping a network speed along the road ahead of the host vehicle using the historical network speed data from the plurality of remote actors;
    identifying a bad network coverage zone along the road ahead of the host vehicle, wherein the bad network coverage zone is a plurality of road segments in the road where the network speed is less than a predetermined speed threshold;
    determining an amount of time that the host vehicle will spend in the bad network coverage zone;
    determining an amount of application data to cache as a function of the amount of time that the host vehicle will spend in the bad network coverage zone;
    caching the amount of application data before the host vehicle reaches the bad network coverage zone;
    receiving current network speed data, wherein the current network speed data includes current network speed measurements at a current time along the road, and the host vehicle is currently moving along the road, wherein the network speed is mapped using the historical network speed data from the plurality of remote actors and the current network speed data;
    virtually dividing the road into the plurality of road segments, wherein each of the plurality of road segments has the same length, and wherein at least two of the historical network speed measurements are taken at the same one of the plurality of road segments but at different times;
    generating a cumulative distribution function (CDF) of the historical network speed measurements, wherein the network speed is mapped using the CDF of the historical network speed measurements.

2. The method of claim 1, wherein, for a constant bit rate, the amount of application data to cache is a function of an average network speed in the bad network coverage zone and a network traffic in the bad network coverage zone.

3. The method of claim 2, wherein, for the constant bit rate, the amount of application data to cache is a function of the amount of time that the host vehicle will spend in the bad network coverage zone is determined using a following equation:

$$A_c = S_{avg} \times T - A_T$$

where:
$A_T$ is a network traffic in the bad network coverage zone;
T is a time that the host vehicle will spend in the bad network coverage zone;
$S_{avg}$ is an average network speed in the bad network coverage zone; and
$A_C$ is the amount of application data to cache.

4. The method of claim 1, further comprising:
determining a buffer capability in the plurality of road segments using a following equations:

$$A_i = \overline{s_i}(S - \overline{s_i})^\alpha t_i,$$

$$\alpha < 0$$

where:
i is one of the plurality of road segments of the road;
$A_i$ is an expected amount of traffic to buffer in one of the plurality of road segments;
$\overline{s_1}$ is an expected network speed in one of the plurality of road segments;
S is a maximum measured network speed in one of the plurality of road segments;
$t_i$ is an expected vehicle travel time in one of the plurality of road segments; and
α is a predetermined number.

5. The method of claim 1, wherein the amount of application data to cache is a function of an expected amount of traffic to buffer in the bad network coverage zone.

6. The method of claim 5, wherein mapping the network speed along the road ahead of the host vehicle using the historical network speed data from the plurality of remote actors includes determining a segment network speed for each of the plurality of road segments of the road ahead of the host vehicle.

7. The method of claim 6, further comprising controlling a QoS parameter of a real-time application based on the segment network speed at a first road segment of the plurality of road segments before the host vehicle reaches the first road segment of the plurality of road segments, and the QoS parameter is at least one of bitrate, received signal strength indicator (RSSI), delay, jitter, video codec, video resolution, or framerate.

8. A tangible, non-transitory, machine-readable medium, comprising machine-readable instructions, that when executed by a processor, cause the processor to:
receive historical network speed data from a plurality of remote actors, wherein the historical network speed data includes historical network speed measurements at different times along a road ahead of a host vehicle;
map a network speed along the road ahead of the host vehicle using the historical network speed data from the plurality of remote actors;
identify a bad network coverage zone along the road ahead of the host vehicle, wherein the bad network coverage zone is a plurality of road segments in the road where the network speed is less than a predetermined speed threshold;
determine an amount of time that the host vehicle will spend in the bad network coverage zone;
determine an amount of application data to cache as a function of the amount of time that the host vehicle will spend in the bad network coverage zone;
cache the amount of application data before the host vehicle reaches the bad network coverage zone;
receive current network speed data, wherein the current network speed data includes current network speed measurements at a current time along the road, and the host vehicle is currently moving along the road, wherein the network speed is mapped using the historical network speed data from the plurality of remote actors and the current network speed data,
wherein, for a periodic bit rate, the amount of application data to cache is a function of a network traffic in the bad network coverage zone, a time that the host vehicle will spend in the bad network coverage zone, and an application's peak network speed in the bad network coverage zone, and
wherein, for the periodic bit rate, the amount of application data to cache is determined using a following equation:

$$A_c = \alpha \times S_{peak} \times T - A_T$$

where:
$A_T$ is a network traffic in the bad network coverage zone;
T is a time that the host vehicle will spend in the bad network coverage zone;
$S_{peak}$ is an application's peak network speed in the bad network coverage zone;
α is a ratio of a peak network speed for unit of time; and
$A_C$ is the amount of application data to cache a delay-tolerant applications.

9. The tangible, non-transitory, machine-readable medium of claim 8, wherein the tangible, non-transitory, machine-readable medium, further comprising machine-readable instructions, that when executed by the processor, causes the processor to:
determine a buffer capability in the plurality of road segments using a following equations:

$$A_i = \overline{s_i}(S - \overline{s_i})^\alpha t_i,$$

$$\alpha < 0$$

where:
i is one of the plurality of road segments of the road;
$A_i$ is an expected amount of traffic to buffer in one of the plurality of road segments;
$\overline{s_1}$ is an expected network speed in one of the plurality of road segments;
S is a maximum achievable network speed allowed by communication technology in ideal network conditions;

$t_i$ is an expected vehicle travel time in one of the plurality of road segments; and α is a predetermined number.

10. A system for maintaining network quality of service (QOS) for in-vehicle applications, comprising:
a communication transceiver;
a controller in communication with the communication transceiver;
wherein the controller is programmed to:
receive historical network speed data from a plurality of remote actors, wherein the historical network speed data includes historical network speed measurements at different times along a road ahead of a host vehicle;
map a network speed along the road ahead of the host vehicle using the historical network speed data from the plurality of remote actors;
identify a bad network coverage zone along the road ahead of the host vehicle, wherein the bad network coverage zone is a plurality of road segments in the road where the network speed is less than a predetermined speed threshold;
determine an amount of time that the host vehicle will spend in the bad network coverage zone;
determine an amount of application data to cache as a function of the amount of time that the host vehicle will spend in the bad network coverage zone; and
cache the amount of application data before the host vehicle reaches the bad network coverage zone,
wherein the amount of application data to cache an adaptive bit rate application is a function of a network traffic in the bad network coverage zone, a time that the host vehicle will spend in the bad network coverage zone, a network speed in the bad network coverage zone, and a weight that is greater in recent history and is inversely proportional to the time lapsed.

11. The system of claim 10, wherein the controller is programmed to the amount of application data to cache the adaptive bit rate application using a following equation:

$$A_c = \sum_{i=0}^{M} w_c \times S_i \times T - A_T$$

where:
i is a time unit from 0 to M;
$A_T$ is the network traffic in the bad network coverage zone;
T is the time that the host vehicle will spend in the bad network coverage zone;
$S_i$ is the network speed in the bad network coverage zone at the time i;
$w_t$ is the weight that is greater in recent history and is inversely proportional to the time i; and
$A_C$ is the amount of application data to cache a delay-tolerant application.

12. The system of claim 10, wherein the road segment is one of a plurality of road segments, and the controller is programmed to:
receive current network speed data, wherein the current network speed data includes current network speed measurements at a current time along the road, and the host vehicle is currently moving along the road; and
a weighted average approach to estimate and map the network speed along the road ahead of the host vehicle.

13. The system of claim 10, wherein the controller is programmed to:
receive current network speed data, wherein the current network speed data includes current network speed measurements at a current time along the road, and the host vehicle is currently moving along the road; and
use a delta approach to map the network speed along the road ahead of the host vehicle using the historical network speed data and the current network speed data;
wherein the delta approach includes:
estimating a first set of network speeds for the plurality of road segments using the historical network speed measurements in a past predetermined number of days;
estimating a second set of current network speeds for the plurality of road segments using the current network speed measurements measured by the host vehicle;
determining a difference between the first set of network speeds and the second set of current network speeds to determine delta values;
determining a statistic value for the delta values; and
adjusting a network speed estimate for a current road segment of the plurality of road segments using the statistic.

* * * * *